Dec. 6, 1932.  P. PICKERING  1,890,234
DEVICE FOR CUTTING SHEETS OF TOUGH OR HARD MATERIAL
Filed Feb. 7, 1930
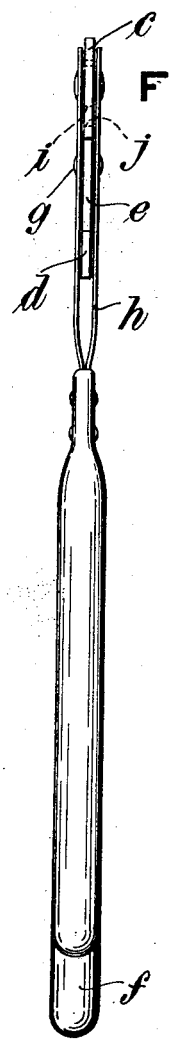
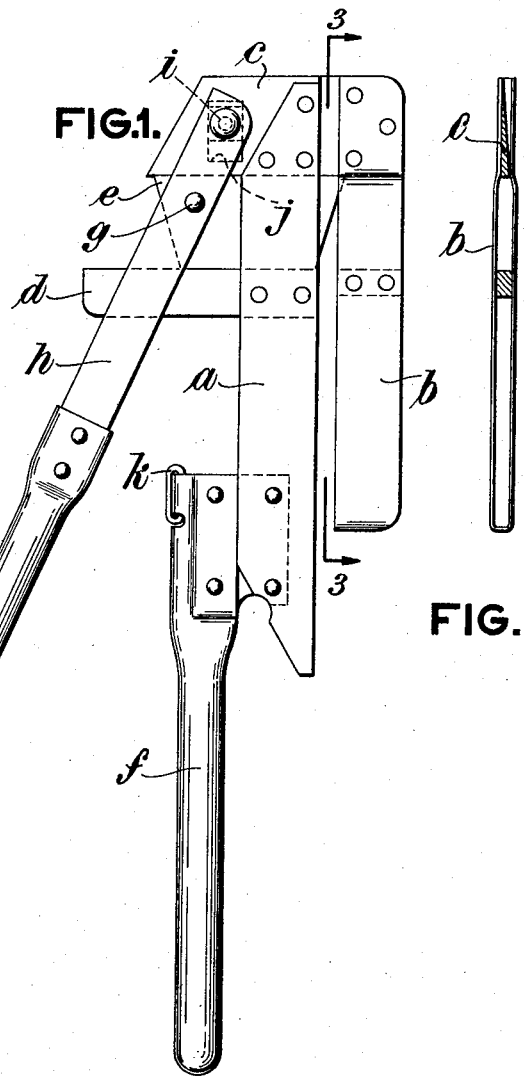
Inventor:
PERCY PICKERING.
by his Attorney:

Patented Dec. 6, 1932

1,890,234

UNITED STATES PATENT OFFICE

PERCY PICKERING, OF BIRMINGHAM, ENGLAND

DEVICE FOR CUTTING SHEETS OF TOUGH OR HARD MATERIAL

Application filed February 7, 1930, Serial No. 426,646, and in Australia February 9, 1929.

This invention relates to devices for cutting sheets of tough or hard material, including for example fibro cement.

The object of the invention is to provide a portable, simple, and economically constructed device adapted to be manually or mechanically operated for cutting such sheets with ease and convenience.

For this purpose I provide a device having a top jaw and a bottom jaw united at one end by a connecting piece, with a cutter reciprocatable in the top jaw, and with a recess in the bottom jaw for entrance of the edge of the cutter, and I make the top jaw of such length that at its free end it extends substantially beyond the cut made in the sheet by the cutter, and that it consequently forms an obstruction of considerable extent preventing upward curl of the sheet when the cutter is pressed against the sheet and tends to distort the same. Preferably I also lengthen the bottom jaw, to prevent downward curling, as this is also liable to occur at times, the stresses set up by the cutting operation varying according to the conformation of the sheet, particularly with corrugated sheeting.

A tool according to the invention is shown in the accompanying drawing, in which Fig. 1 is a side elevation showing the same held upright, with the jaws in vertical position.

Fig. 2 is an elevation viewed from the right hand side of Fig. 1, and

Fig. 3 is a section on the line 3—3 of Fig. 1.

In the drawing $a$ and $b$ represent the two jaws, $a$ being the top jaw when the tool is held in the usual position for a horizontal cut. The jaws $a$ and $b$ are connected to each other by a flat connecting piece or plate $c$, which is wedge shaped, as shown in Fig. 3, for a purpose to be explained hereinafter. Fixed to the jaw $a$ is a guide $d$, having one edge parallel with an edge of the plate $c$, and between these parallel edges there is guided a cutter $e$ working in a slot provided therefor in the jaw $a$. The jaw $b$ likewise has a recess or slot, into which the edge of the cutter can enter, the width of this slot substantially exceeding the thickness of the cutter $e$, as is shown in Fig. 2. The edge of the cutter is aslant, relatively to the parallel edges of the jaws, for the purpose of obtaining a shearing cut. The tool has a handle $f$ fixed to the jaw $a$, and for actuating the cutter $e$ there is pivoted to the same, at $g$, a double-armed lever $h$ having its shorter arm engaged, by means of a stud $i$, with a slot $j$ in the plate $c$. A rubber buffer $k$ is attached to the front part of the handle to serve as a resilient stop limiting the downward movement of the lever.

By rocking the lever $h$ as indicated in Fig. 1 by a double-headed arrow the cutter is reciprocated between its guides, passing across the slot between the jaws $a$, $b$, so that when there is a sheet in this slot the same is cut. After each cut the sheet is pushed towards the plate $c$, or the tool is pulled across the sheet, so that the plate $c$, enters the slit made in the sheet, which is of ample width to accommodate it. The reason for making the plate $c$ wedge shaped, tapering towards the front, is that this facilitates making a curved cut, the plate being capable of being deflected slightly while in the slit of the sheet.

For cutting sheet iron the clearance at the sides of the cutters in the slotted jaw is not desirable, as a more precise shearing action is required, but this can be obtained with the same tool by placing between the jaws a thin steel plate having a slot which is accurately centered with the slot in the lower jaw, but is narrower, this plate then coacting with the cutter to shear the sheet. The steel plate should, of course, for convenience be clamped to the lower jaw.

It will, of course, be understood that the tool may be designed for actuation by mechanical power, instead of manually, in which case it will be fixed to a suitable bench. The manually actuated tool may also be fixed to a bench or support, if it is desired to feed the sheet during the cutting operation, instead of moving the tool across the sheet, but preferably the fixing is effected in such a way as to allow of slight lateral rocking movement of the tool, to prevent undue stress being imposed on the plate $c$ in the event of the tool being operated without due care.

What I claim as my invention and desire to secure by Letters Patent of the United States is:—

A sheet cutter comprising in combination a top jaw and a bottom jaw having between them a slot to receive the sheet, a cutter reciprocatable in said top jaw, a connecting piece uniting said jaws at one end thereof, close to said cutter and adapted to pass through cuts made by the cutter in the sheet, a handle fixed to said top jaw, and mechanism including a second handle above said top jaw for reciprocating said cutter, said bottom jaw having a recess for entrance of the edge of said cutter of a width leaving substantial clearance on both sides of said cutter, and both said jaws extending at the free ends thereof substantially beyond the cutter, in the direction of the cut made in the sheet, so that obstructions of substantial length are afforded to prevent upward and downward curl of the sheet.

PERCY PICKERING.